UNITED STATES PATENT OFFICE.

JAMES C. ANDERSON, OF HIGHLAND PARK, ILLINOIS.

PROCESS OF COLORING CLAY FOR BRICKS, TILES, &c.

SPECIFICATION forming part of Letters Patent No. 262,339, dated August 8, 1882.

Application filed March 25, 1882. (No specimens.)

*To all whom it may concern:*

Be it known that I, JAMES C. ANDERSON, a citizen of the United States, residing at Highland Park, in the county of Lake and State of Illinois, have invented a new and useful Process of Coloring Clay for Bricks, Tiles, and other like Articles, of which the following is a specification.

It is well known that suitable clays from which bricks are made are numerous and abundant throughout the whole country, but that they vary greatly in their composition, and that few of such clays possess the requisite ingredients to give a good red color, recognized as the acme of beauty in this well-known art. Bricks as heretofore made have been of various shades and colors, such shades of color being the natural product of the various clays when burned at a red heat, or to the fixing-point of pottery. These variable color properties are mainly due to differences in the quantity and kind of mineral oxides present, (chiefly iron,) and in a lesser degree to other foreign matter acting as deoxidizing agents to such metals. It is well known that the clays possessing the requisite color ingredients are not generally distributed, but, to the contrary, are to a great extent isolated geographically, so that the bricks have to be transported long distances, at great expense, to supply the demands in localities where the proper kind of clay is not found. Notably is this the case in the city of Chicago, which city has paid heretofore for transportation alone on pressed bricks a price more than equal to the original cost of their production. It will be seen therefore that a net loss, due largely to color quality alone, to a part of the country more than equals the sum of cost of such brick to other parts favored with suitable color-producing clay. It is also highly desirable in decorative brick-work that other than natural colors—as, for example, black, blue, brown, green, &c.— may be obtained, and that such colors be produced and imparted to the brick, maintaining the same surface texture and fixedness of color obtainable as distinctive properties of bricks made from the natural clays. Heretofore such special-colored brick have been enameled with vitreous or other enamel of various shades; but such is only a surface coat of color, and is liable to be destroyed or broken. Bricks have also been colored after having been burned by saturation in bituminous and other like compounds; but such are objectionable, for the reason that they will fade and change their color, producing an unsightly appearance in the building where used. These methods are also objectionable inasmuch as they are not of same texture and do not present the same surface appearance in the walls of a building, and therefore do not match with the other bricks.

The object of my present invention is to produce bricks, tiles, and other articles of a uniform red or other desirable color throughout their entire structure from clay which does not naturally possess the requisite ingredients for coloring the same; and to this end my invention consists in incorporating with the clay while being reduced to a fine powder the requisite coloring-matter in a dry powdered condition.

The mechanism which I prefer to use in the disintegration or reduction of the clay, clay alluvium, shale, &c., and for mixing and intermingling the coloring-matter therewith forms the subject-matter of separate patents granted to me, numbered and dated as follows, to wit: No. 214,481, dated April 22, 1879; No. 222,225, dated December 2, 1879; No. 246,992, dated September 13, 1881; but other mechanism and means may be used without departing from the spirit of my invention.

The coloring-matter is added in a dry powdered state in the proper proportion to produce the requisite color to the clay, clay alluvium, shale, &c., at the time it is introduced into the mechanism, where it is thoroughly intermingled and incorporated with the clay into one homogeneous mass.

It will be borne in mind that the clay is in a dry or practically dry state, and that the coloring-matter is introduced in a dry powdered condition, and is so thoroughly and intimately incorporated that when the bricks, tiles, &c., are burned the color will be uniform throughout the entire structure.

I do not wish to limit myself to any particular coloring-matter or color. I will state, however, that the coloring-matter should be from metals or metallic oxides, or other substances which will withstand the test of the furnace and not be liable to be burned out in the firing.

I would remark in this connection that the bricks or other articles are made directly from the dry powdered clay, or, rather, as it leaves the disintegrating and mixing mechanism, so that a great agitation is required to thoroughly mix the necessarily small amount of coloring-matter with the mass of clay; and by my method the coloring-matter is so incorporated with the clay into one homogeneous body that when burned the bricks, tiles, &c., present precisely the same appearance and maintain the same physical characteristics of texture and fixedness of color, and are practically the same as though made from clays with which such coloring-matters were originally combined by nature.

Having thus described my invention, what I claim, and desire to secure by Letters Patent, is—

1. The within-described process of incorporating coloring-matter with clay, the same consisting in reducing the coloring-matter into a fine-powdered condition, and then mixing and thoroughly incorporating the same while dry with a dry or practically dry clay while said clay is being reduced to a fine powder, as set forth.

2. In the manufacture of bricks, tiles, &c., from clay in which the natural coloring-matter is wanting, the process herein described of incorporating the desired shade of coloring-matter with the clay while both are in a dry or practically dry and powdered condition, as set forth.

J. C. ANDERSON.

Witnesses:
  FRANK L. BLAKE,
  F. A. BARNES.